June 21, 1927.
E. A. WRIGHT
1,632,940
CONTROL PEDAL
Filed Aug. 2, 1926
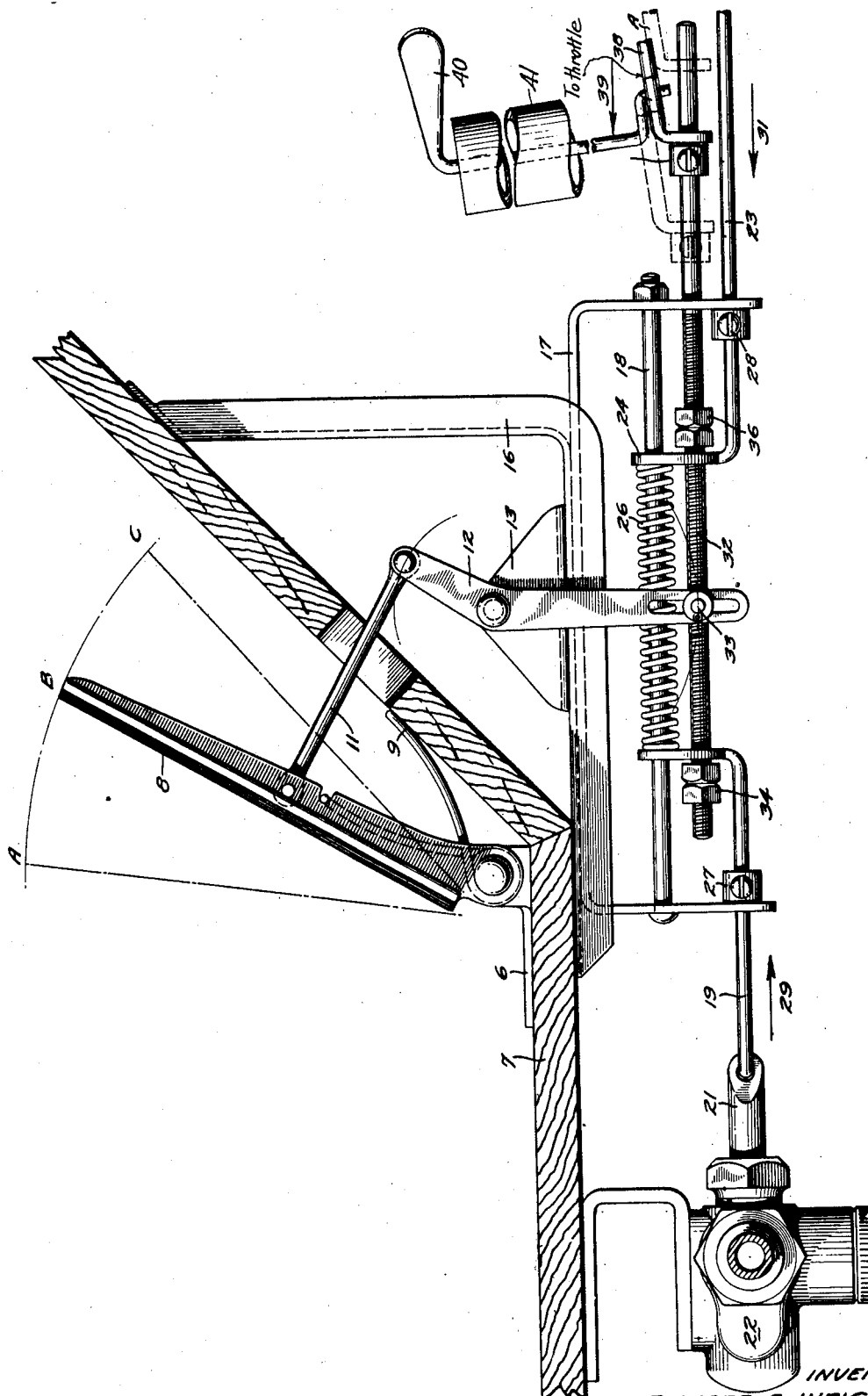
INVENTOR
EDWARD A. WRIGHT
BY White Scott
his ATTORNEYS Patented June 21, 1927.

1,632,940

UNITED STATES PATENT OFFICE.

EDWARD A. WRIGHT, OF FRESNO, CALIFORNIA.

CONTROL PEDAL.

Application filed August 2, 1926. Serial No. 126,578.

My invention relates to foot pedals primarily for use in automobiles for controlling the speed of the engine and also for controlling the brakes. More particularly, my invention relates to a unitary pedal which is adapted to control both the speed of the engine and the operation of the brakes.

An object of the invention is to provide in an engine driven vehicle, a single manipulable device for controlling by pedal pressure in one direction the braking of the vehicle and the power developed by the engine.

Another object of the invention is to provide a single brake and engine control manually operable in one direction only.

Another object of the invention is to provide a control pedal which operates to apply the vehicle brakes without the use of force by the vehicle operator.

Another object of the invention is to provide a control pedal which will automatically set the vehicle brakes when the control pedal is in normal position.

An additional object of the invention is to provide a brake and engine control device operative during the initial portion of its manually actuated movement to control the vehicle brakes and operative during the final portion of its manually actuated movement to control the power output of the engine.

A further object of the invention is to provide a control pedal which is linked to the manual control of the engine speed in such a manner that the degree to which the brakes are applied by the release of the control pedal may be adjusted.

The invention possesses other advantageous features, some of which with the foregoing, will be set forth at length in the following description where I shall outline in full that form of the control pedal of my invention, which I have selected for illustration in the drawings accompanying and forming part of the present specification. In said drawings I have shown one form of control pedal embodying my invention, but it is to be understood that I do not limit myself to such form since the invention as set forth in the claims, may be embodied in a plurality of forms.

In the drawings:—

The figure is a longitudinal section on a vertical plane of a portion of a vehicle adjacent the driving compartment, the control pedal of my invention and its connections being shown in elevation.

Broadly speaking, the control pedal of my invention is a unitary pedal connected to the vehicle brakes and to the mechanism which controls the speed of the engine in such a manner that movement of the pedal in one direction serves first to release the brakes and then to accelerate the engine while return movement of the pedal serves first to decelerate the engine and then to apply the brakes.

There have been unitary control pedals proposed and adopted which are usually pivoted adjacent the midpoint and depend upon downward pressure by the vehicle operator's toe for depressing the forward portion to increase the speed of the vehicle engine and upon a downward thrust by the heel of the operator's foot for depressing the rearward portion and applying the brakes of the vehicle. The brakes are usually actuated thru the medium of some sort of servo mechanism such as a compressed air or vacuum system. The control pedal of my invention is to obviate the necessity of the operator rocking his foot from toe to heel to change from the operation of controlling the speed of the engine to the operation of applying the brakes. Such pedals as have already been used are urged to the neutral position by springs so that the speed of the engine is reduced and the brakes are released. In the neutral position of my device the engine speed is reduced but the brakes are fully applied.

In the embodiment of the invention shown in the drawings, the manipulable member for controlling the brakes and the power output of the engine is preferably a hinged foot pedal the bottom 6 of which is affixed to the vehicle floor board 7 by means of suitable fastenings.

The treadle portion 8 of the foot pedal is hinged to the portion 6 and is urged upwardly (to the left of the figure) by means of a suitable spring 9 of the grasshopper type which at one end bears on the floor board 7 and at the other end fits in a notch in the treadle portion 8. The treadle 8 is connected by means of a link 11 to a lever 12. A support 13 to which the lever 12 is in turn pivoted rests upon an angle bracket 16 affixed to the floor boards 7. The bracket 16 carries a hanger 17 which is brazed or welded thereto and which is provided with two depending arms. A rod 18 parallels the central portion of the hanger 17 and is supported by the two depending arms. A control rod 19 bent into an L shape and having an eyelet at one end which fits over the rod 18, passes thru a suitable aperture in one of the depending arms of the hanger 17 and connects with the valve operating member 21 of an air valve 22. The air valve 22 is provided for controlling the brakes of the vehicle which are assumed to be pneumatic. It is to be understood, of course, that the rod 19 may connect with any other suitable brake controlling mechanism.

A rod 23 similar to the rod 19 and provided with an eyelet 24 surrounding the rod 18, connects with the throttle of the carbureter of the engine, not shown. If the engine is steam or electric, suitable connection may be made to the speed governing mechanism. A spring 26 surrounds the rod 18 and urges the eyelets of the rods 19 and 23 apart. The rods 19 and 23 are prevented from moving apart an excessive amount by adjustable collars 27 and 28 which abut the depending arms of the hanger 17. The rod 19 operates the valve 22 to apply the brakes when it is moved in the direction of the arrow 29 while the rod 23 opens the throttle to increase the speed of the vehicle engine when it is moved in the direction of the arrow 31. The spring 26 therefore is made with sufficient strength to urge the rods 19 and 23 just to close the valve 22 and the engine throttle. The rods 23 and 19 are connected with the control pedal 8 by means of the lever 12 and a rod 32 which is adapted to slide axially in apertures in the rods 19 and 23 and also to pass thru a suitable opening in a depending arm of the hanger 17. The lower end of the lever 12 is slotted to receive a cross pin 33 which is affixed to the rod 32. The rod 32 is threaded for a greater portion of its length to receive lock nuts 34 and 36 which may be adjusted on the rod 32 to bear against the rods 19 and 23 at the proper points in the travel of the lever 12.

In the position of the mechanism shown in the drawing and indicated as position B, it is assumed that the operator's foot is bearing upon the treadle portion 8 and is maintaining the parts in position B against the action of the grasshopper spring 9. It is to be understood that the spring 9 is very much stronger than the spring 26 and controls the position of the parts except when force is applied to the treadle 8. With the treadle 8 in position B, as shown, the rod 32 is in its intermediate position and the lock nuts 34 and 36 do not bear against either the rod 19 or the rod 23. The spring 26 is then effective in urging both the rods 19 and 23 as far apart as possible, with the collars 27 and 28 bearing against the depending portions of the hanger 17. The valve 22 and the throttle valve of the carbureter are then both in closed position, the brakes are released and the engine is running at minimum speed.

If the vehicle operator by pressure of his foot then forces the treadle 8 into position C, as indicated by the broken line in the drawing, the lower end of the lever 12 and the rod 32 are correspondingly moved (to the left in the drawing) engaging the lock nut 36 with the upstanding portion of the rod 23 and moving the rod in the direction indicated by the arrow 31 to open the throttle of the carbureter and allow the engine speed to increase. This movement of the rod 23 is against the bias of the spring 26 which by its own action keeps the valve 22 closed.

When the vehicle operator releases the pressure of his foot and permits the grasshopper spring 9 to move the treadle and associate mechanism into position A, as indicated by the broken line in the drawing, the lower end of the lever 12 and the rod 32 are moved to the right permitting the spring 26 to force the rod 23 to the right until the collar 28 abuts the depending portion of the hanger 17 thereby slowing the speed of the engine. As the rod 32 moves farther to the right due to the urging of the spring 9, the lock nuts 34 engage the upstanding portion of the rod 19 and move it to the right to apply the brakes by opening the valve 22. This further movement of the rod 19 to the right is against the urging of the spring 26 which tends to keep the rod 23 in closed position, but the spring 9 is strong enough to overcome the spring 26. The treadle 8 remains in position A and keeps the brakes applied thru the medium of the valve 22 until the operator again exerts force on the treadle 8. It is thus seen that initial downward movement of the treadle 8 from position A gradually releases the brakes and further movement increases the speed of the engine. The upward movement of the treadle which takes place due to the influence of the grasshopper spring 9 first decreases the speed of the engine and then gradually applies the brakes until, when the treadle has reached position A, the brakes are in fully applied position.

It is considered desirable in some instances to provide means for regulating the maximum amount which the brakes are applied by the release of the treadle 8. In the present instance this means comprises a connection with the hand or manually operated throttle control usually located on the steering wheel of the vehicle so that by properly positioning the hand control, the vehicle operator can regulate the maximum amount which the brakes are applied upon the release of the treadle 8. A collar 37 is positioned upon the extended portion of the rod 32 and bears against an eyelet formed in the end of a rod 38 which is attached to the manual throttle control 40, usually mounted on the steering column 41 convenient to the vehicle driver. The control 40 can be maintained in adjusted position by the retainer 42. When the rod 38 is moved in the direction of the arrow 39, the rod 32 is moved toward the left, the lock nuts 36 engage the rod 23 which is then moved in the direction of the arrow 31 and the engine throttle is opened, permitting the engine speed to increase. The rod 38 is normally located in position A so that the grasshopper spring 9 is free to return the treadle 8 to position A and apply the brakes fully. As the rod 38 is moved toward the left or toward position B by suitable manipulation of the manual control, the collar 37 abuts against the eyelet in the rod 38 in correspondingly earlier positions of the rod 32. The treadle 8 and the valve 22 are both prevented from attaining maximum position. The brakes therefore are not fully applied when the manual throttle control is so positioned as to cause the collar 37 to abut the eyelet in the rod 38.

It will be appreciated that by use of the control pedal of my invention the vehicle driver will be enabled to control both the acceleration and the braking of his vehicle with the conventional pedal movement and that when he leaves the vehicle the pedal will automatically apply the brakes. Also, by suitable manipulation of the manual throttle control, the maximum amount which the brakes are applied may be regulated.

I claim:

1. A control pedal for a vehicle, comprising a treadle for controlling the vehicle brakes and the engine speed regulator in sequence, said treadle being manually operable in one direction only.

2. A control pedal for a vehicle, comprising a treadle manually movable in one direction only and a spring for moving said treadle in the opposite direction, said treadle being connected thru a lost motion connection to the vehicle brakes and to the engine speed regulator.

3. A control pedal for a vehicle, comprising a treadle connected to the vehicle brakes and to the engine speed regulator, manual movement alone of the treadle in one direction serving first to release said brakes and then to increase the speed of the engine.

4. A control pedal for a vehicle, comprising a treadle connected to the vehicle brakes and to the engine speed regulator and a spring for urging said treadle in one direction, the action of said spring alone serving first to decrease the speed of the engine and then to actuate the control for applying said brakes.

5. A control pedal for a vehicle, comprising a treadle connected to the vehicle brakes, a spring for urging said treadle to apply said brakes, and means for limiting the brake applying movement of said treadle.

6. A control pedal for a vehicle, comprising a treadle connected to the vehicle brakes, a spring for urging said treadle to apply said brakes, and a manually adjustable stop for limiting the brake applying movement of said treadle.

7. A control device for an engine driven vehicle provided with brakes comprising a manipulable member normally held in brake applying position, means connecting the member with the brake control and with the engine control and a lost motion device in said means whereby movement of the member in one direction from normal position first operates the brake control to release the brakes and then operates the engine control to increase the power output of the engine.

8. A control device for an engine driven vehicle provided with brakes actuated by a servo mechanism, a control for said servo mechanism, a control for the power output of said engine, a manipulable member, a lost motion linkage connecting said member with both of said controls, and a spring for urging said member to neutral position, the connection being such that the brakes are fully applied in the neutral position of said member.

In testimony whereof, I have hereunto set my hand.

EDWARD A. WRIGHT.